United States Patent
Yashiro et al.

(12) 
(10) Patent No.: US 11,305,818 B2
(45) Date of Patent: Apr. 19, 2022

(54) VEHICLE BODY FRONT STRUCTURE

(71) Applicant: SUZUKI MOTOR CORPORATION, Hamamatsu (JP)

(72) Inventors: Hironao Yashiro, Hamamatsu (JP); Tatsuya Manabe, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 308 days.

(21) Appl. No.: 16/660,303

(22) Filed: Oct. 22, 2019

(65) Prior Publication Data

US 2020/0148267 A1    May 14, 2020

(30) Foreign Application Priority Data

Nov. 8, 2018   (JP) .............................. JP2018-210367

(51) Int. Cl.
*B62D 21/15*   (2006.01)
*B62D 24/02*   (2006.01)
*B62D 21/11*   (2006.01)

(52) U.S. Cl.
CPC ............ *B62D 21/152* (2013.01); *B62D 21/11* (2013.01); *B62D 24/02* (2013.01)

(58) Field of Classification Search
CPC ...... B62D 21/152; B62D 21/15; B62D 21/11; B62D 24/04; B62D 24/02
See application file for complete search history.

(56) References Cited

U.S. PATENT DOCUMENTS

2017/0088183 A1   3/2017 Yamada ............... B62D 21/155

FOREIGN PATENT DOCUMENTS

| CN | 101037118 B | | 4/2012 | |
|---|---|---|---|---|
| JP | 2015054591 A | * | 3/2015 | ........... B62D 21/152 |
| JP | 2017-30700 A | | 2/2017 | |
| JP | 2019189183 A | * | 10/2019 | |
| KR | 10-1575335 B1 | | 12/2015 | |

* cited by examiner

Primary Examiner — Lori L Lyjak
(74) Attorney, Agent, or Firm — Stein IP, LLC

(57) ABSTRACT

Provided is a vehicle body front structure capable of suppressing load concentration in a collision body and preventing local deformation of the collision body. A vehicle body front structure according to one embodiment of the present invention is a vehicle body front structure including a front side member extending in the longitudinal direction on the side of a power unit mounting room located at the front of a vehicle, the vehicle body front structure further including: a strut tower that is disposed on the outer side in the vehicle width direction of the front side member, and to which a suspension is fixed; a fender apron disposed on the front side of the strut tower and on the outer side in the vehicle width direction of the front side member; a first member fixed to the front end of the front side member and extending in the vertical direction; a reinforcement member fixed to the outer side in the vehicle width direction of the lower end of the first member, the reinforcement member having a flat plate portion facing the front of the vehicle over a predetermined length in the vertical direction; and a second member connecting the reinforcement member and the fender apron.

9 Claims, 6 Drawing Sheets

VEHICLE BODY FRONT STRUCTURE

CROSS-REFERENCE TO RELATED APPLICATION

This application is based upon and claims the benefit of priority from the prior Japanese Patent Application No. 2018-210367, filed on Nov. 8, 2018, the entire contents of which are incorporated herein by reference.

FIELD

The present invention relates to a vehicle body front structure.

BACKGROUND

A vehicle frame structure is disclosed in Japanese Patent Laid-open Publication No. 2017-30700, for example. In the vehicle frame structure disclosed in Japanese Patent Laid-open Publication No. 2017-30700, a cross member extending in the vehicle width direction is spanned in front of a pair of left and right side rails, and a bumper reinforcement is disposed in front of the side rails. In Japanese Patent Laid-open Publication No. 2017-30700, load receiving portions are respectively provided on outer side surfaces of the side rails in the vehicle width direction at joint portions of the side rails and the cross member.

Also, in Japanese Patent Laid-open Publication No. 2017-30700, the bumper reinforcement is provided at a curved portion that is open to the front end of the vehicle when a load from the front end of the vehicle is input inward in the vehicle width direction from the side rail. Furthermore, in Japanese Patent Laid-open Publication No. 2017-30700, the bumper reinforcement is coupled to protrusions disposed to engage with the load receiving portions when a load from the front end of the vehicle is input to the outside in the vehicle width direction from the side rail in the curved portion. According to Japanese Patent Laid-open Publication No. 2017-30700, with such a configuration, in a case of a collision in which a load from the front end of the vehicle is input to the outside in the vehicle width direction from the side rail in the curved portion, the load is efficiently transmitted from the side rail to the opposite side in the vehicle width direction via the cross member.

In the vehicle frame structure disclosed in Japanese Patent Laid-open Publication No. 2017-30700, reinforcement members interposed between the load receiving portions and the cross member are further disposed inside the side rails. By providing the reinforcement members between the bumper reinforcement and the side rails in this manner, it is possible that the bumper reinforcement can be prevented from being broken inward of the vehicle at the time of an offset collision, and the injury value of a passenger can be reduced.

However, with the configuration as disclosed in Japanese Patent Laid-open Publication No. 2017-30700, it may occur that a load is concentrated only on the upper and lower portions of the bumper reinforcement because deformation of the bumper reinforcement is suppressed. As a result, load concentration in the collision body is likely to occur, which may cause local deformation of the collision body.

In view of such issues, the present invention aims to provide a vehicle body front structure capable of suppressing load concentration in a collision body and preventing local deformation of the collision body.

SUMMARY OF THE DISCLOSURE

In order to solve the above issues, a representative configuration of a vehicle body front structure according to one aspect of the present invention is a vehicle body front structure including a front side member extending in the longitudinal direction on the side of a power unit mounting room located at the front of a vehicle, the vehicle body front structure further including: a strut tower that is disposed on the outer side in the vehicle width direction of the front side member, and to which a suspension is fixed; a fender apron disposed on the front side of the strut tower and on the outer side in the vehicle width direction of the front side member; a first member fixed to the front end of the front side member and extending in the vertical direction; a reinforcement member fixed to the outer side in the vehicle width direction of the lower end of the first member, the reinforcement member having a flat plate portion facing the front of the vehicle over a predetermined length in the vertical direction; and a second member connecting the reinforcement member and the fender apron.

According to the present invention, it is possible to provide a vehicle body front structure capable of suppressing load concentration in a collision body and preventing local deformation of the collision body.

DETAILED DESCRIPTION

Figure 1:
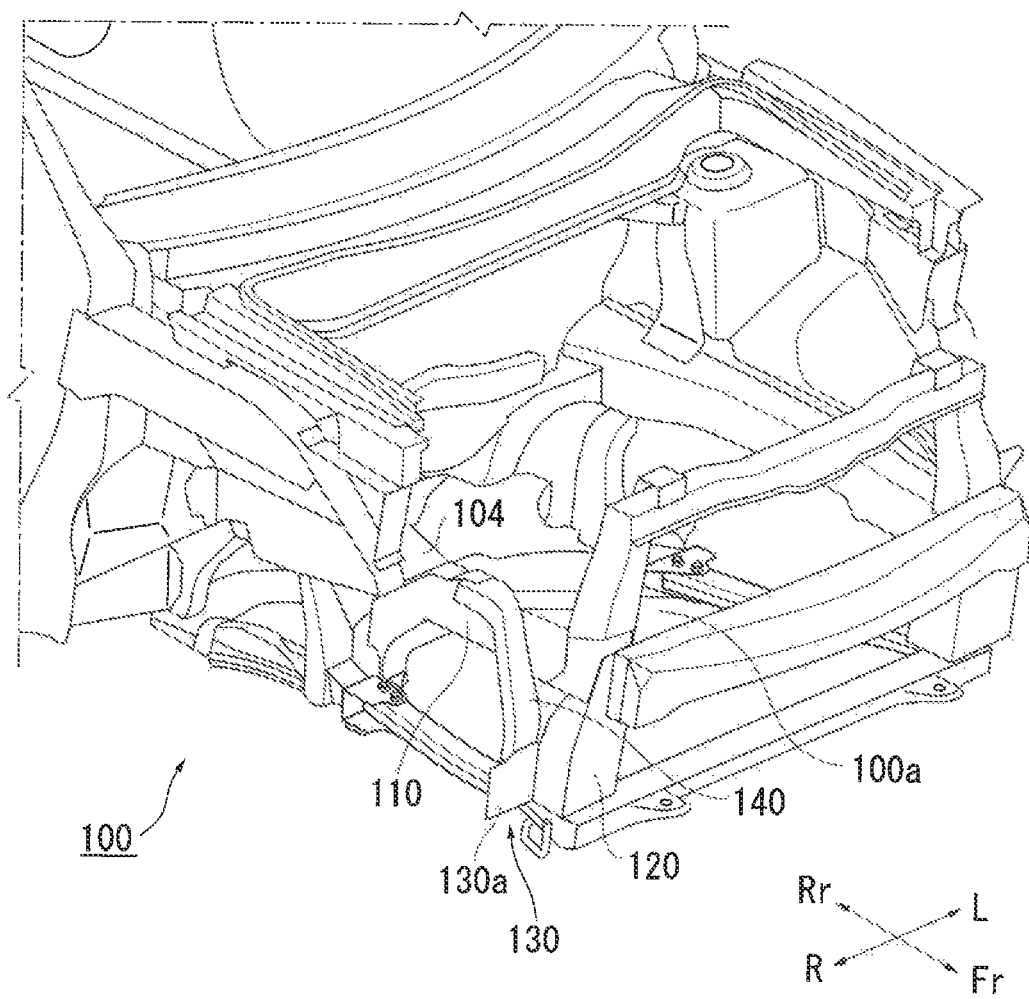
FIG. 1 is an overall perspective view of vehicle body front structure according to the present embodiment.

A vehicle body front structure according to one embodiment of the present invention is a vehicle body front structure including a front side member extending in the longitudinal direction on the side of a power unit mounting room located at the front of a vehicle, the vehicle body front structure further including: a strut tower that is disposed on the outer side in the vehicle width direction of the front side member, and to which a suspension is fixed; a fender apron disposed on the front side of the strut tower and on the outer side in the vehicle width direction of the front side member; a first member fixed to the front end of the front side member and extending in the vertical direction; a reinforcement member fixed to the outer side in the vehicle width direction of the lower end of the first member, the reinforcement member having a flat plate portion facing the front of the vehicle over a predetermined length in the vertical direction; and a second member connecting the reinforcement member and the fender apron.

With the above configuration, the reinforcement member can be supported by the second member when a load is applied from the front to the reinforcement member at the time of a collision. In this manner, the reinforcement member can be prevented from being inclined toward the outer side in the vehicle width direction, and the attitude of the flat plate portion of the reinforcement member can be suitably maintained. Accordingly, the collision body can be received on the wide surface of the flat plate portion, and an impact load is dispersed. For this reason, it is possible to suppress load concentration in the collision body, and to prevent local deformation of the collision body.

The front end of the front side member and the first member may be fixed to make it deformable when receiving a load at the time of a collision, and the second member may include: a front side portion connected to the rear side of the flat plate portion of the reinforcement member and extending upward parallel to the flat plate portion; a middle portion bending toward the rear of the vehicle at the upper end of the front side portion and inclined upward as it extends toward the rear of the vehicle; and a rear side portion bending toward the rear of the vehicle at the upper end of the middle portion and extending parallel to the front side member.

With the above configuration, a collision body can be received also by the front side portion of the second member. Accordingly, because the collision body can be received with a wider surface, it is possible to disperse an impact load more efficiently, and to enhance the above-mentioned effects. Also, when a load is applied from the front at the time of a collision, the front side member deforms at the boundary with the first member. At this time, the second member is also deformed so that the middle portion and the rear side portion fold toward the rear of the vehicle, by bending at the boundary between the front side portion and the middle portion, and at the boundary between the middle portion and the rear side portion. As a result, the front side portion is maintained in the vertical state, and thus it is possible to prevent the flat plate portion of the reinforcement member from being deformed to be folded backward.

The rear end of the second member may be connected to the front side member and the fender apron, and the middle portion of the second member may be inclined to the outer side in the vehicle width direction as it extends toward the front of the vehicle. In this manner, when a load in an oblique direction is applied from the outside in the vehicle width direction toward the inside at the time of an offset collision, the load can be transmitted from the second member to members, such as the front side member and the fender apron, that are located rearward of the vehicle relative to the second member. Therefore, the second member can reliably support the reinforcement member, and the deformation of the reinforcement member in the oblique direction can be prevented. As a result, the attitude of the flat plate portion of the reinforcement member can be suitably maintained, and a collision body can be received over a wide area.

The second member may have a rectangular wave-like or a hat-shaped cross section that protrudes toward the upper side or the front side of the vehicle, the protruding dimension of the cross section may be the largest at the rear side portion, and decreases as it extends toward the middle portion and the front side portion, and the width of the cross section in the vehicle width direction may be narrower at the middle portion than at the front side portion and the rear side portion.

In this manner, by making the cross section of the second member into a rectangular wave-like shape or a hat shape, high rigidity can be obtained at the time of non-collision, and impact can be sufficiently absorbed at the time of a collision. Also, by varying the protruding dimension of the cross section, it is possible to promote bending on impact at the boundary between the front side portion and the middle portion, and at the boundary between the middle portion and the rear side portion.

The front side member may include: a first region extending rearward from the front end; a second region extending from the rear side of the first region; and a third region extending from the rear side of the second region, the first region and the third region have higher rigidity than the second region, and the boundary between the first region and the second region and the boundary between the middle portion and the rear side portion of the second member are disposed at the same position in the vehicle longitudinal direction.

With the above configuration, when the first member moves to the rear of the vehicle due to a load at the time of a collision, the boundary between the first region and the second region of the front side member and the boundary between the middle portion and the rear side portion of the second member are deformed at the same position in the vehicle longitudinal direction. In this manner, the flat plate portion of the reinforcement member fixed to the first member and the front side portion of the second member can be maintained parallel to the front surface of the first member. Therefore, it is possible to more preferably prevent local deformation of a collision body of a collision object.

Preferred embodiments of the present invention will be described below in detail with reference to the accompanying drawings. The dimensions, materials, and other specific numerical values described in these embodiments are merely examples for facilitating the understanding of the present invention, and are not to be construed as limiting the invention unless otherwise stated. It should be noted that elements constituting substantially identical functions and configurations are denoted by identical reference numerals in the present specification and the drawings, and hence redundant description has been omitted. Also, illustrations of elements that are not directly relevant to the present invention have been omitted.

Figure 2:
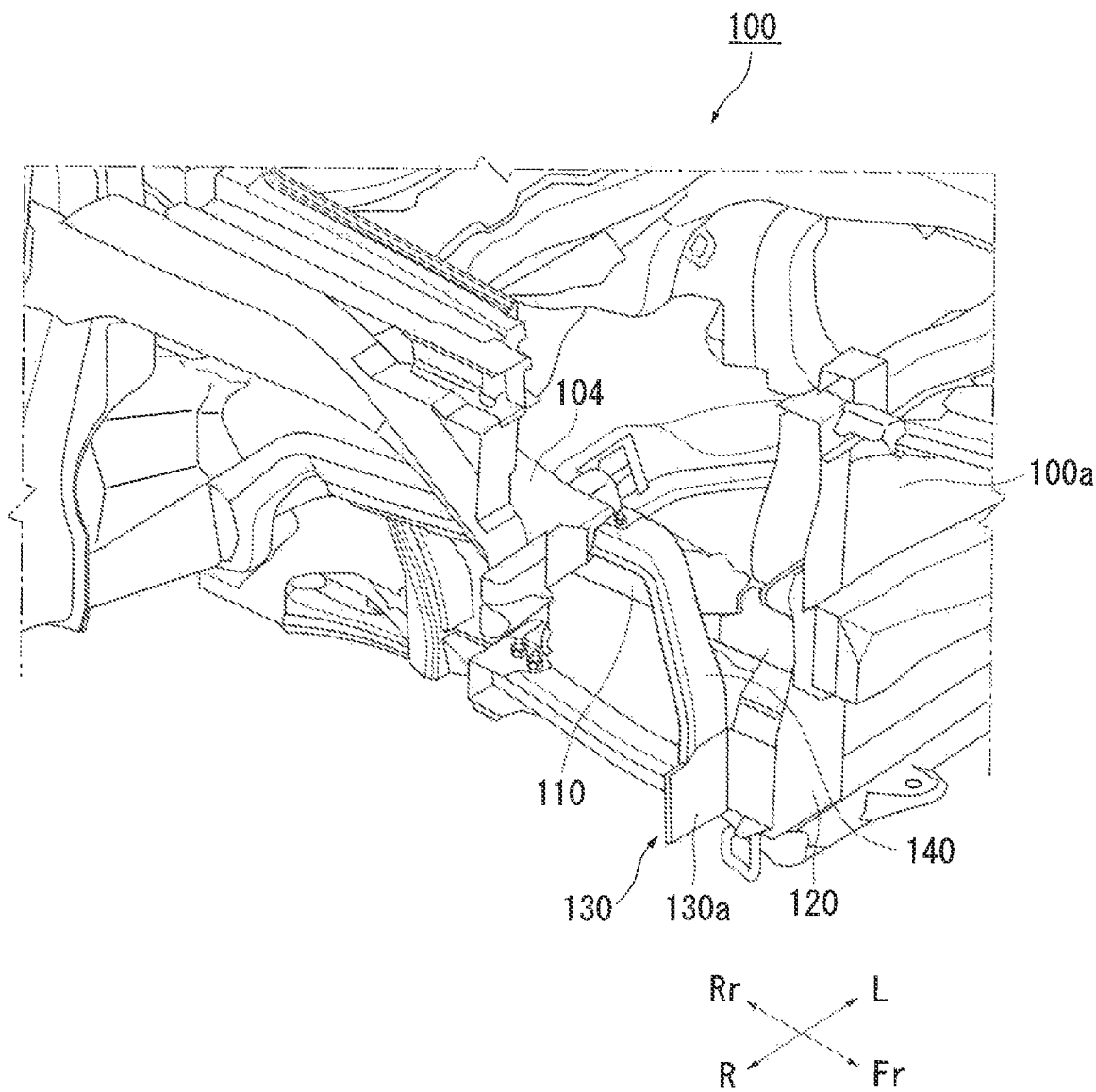
FIG. 2 is an expanded view of the vehicle body front structure in FIG. 1.

FIG. 1 is an overall perspective view of a vehicle body front structure 100 according to the present embodiment. FIG. 2 is an expanded view of the vehicle body front structure 100 in FIG. 1. In the present embodiment, the right side of the vehicle body (not entirely shown) is described as an example, but the present invention is also applicable to the left side. Further, in the drawings used in the following description, front, rear, left, right, up and down directions with reference to the above-mentioned occupant will be referred to as Fr, Rr, L, R, Up, Down, as necessary.

As shown in FIGS. 1 and 2, in the vehicle body front structure 100 of the present embodiment, a front side member 110 extending in the front-rear direction is disposed on the side of a power unit mounting room 100a located at the front of the vehicle.

Figure 3:
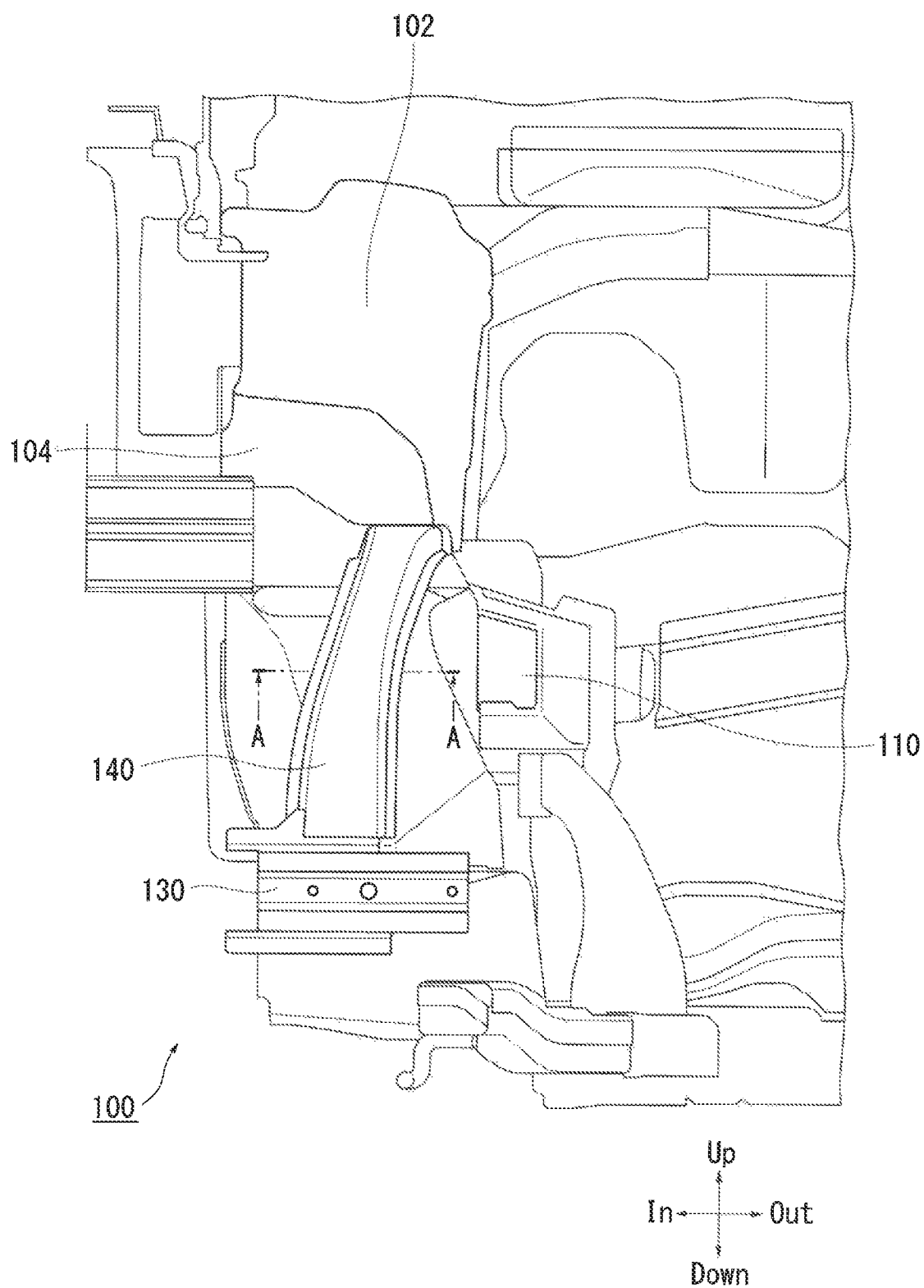
FIG. 3 is a view showing a state in which members behind a front side member in FIG. 2 is observed from the front side.

FIG. 3 is a view showing a state in which members behind the front side member 110 in FIG. 2 are observed from the front side. As shown in FIG. 3, a strut tower 102 to which a suspension (not shown) is fixed is disposed on the outer side in the vehicle width direction of the front side member 110. A fender apron 104 is disposed on the front side of the strut tower 102 and on the outer side in the vehicle width direction of the front side member 110.

In addition to the above-mentioned members, the vehicle body front structure 100 of the present embodiment further includes a first member 120, a reinforcement member 130, and a second member 140. The first member 120 is a member fixed to the front end of the front side member 110 and extending in the vertical direction, and is a radiator support brace in the present embodiment.

The reinforcement member 130 is a member fixed to the outer side in the vehicle width direction of the lower end of the first member 120, and is an apron side front member in the present embodiment. The reinforcement member 130 includes a flat plate portion 130a that extends in the vehicle width direction and faces the front of the vehicle, extending over a predetermined length in the vertical direction. The second member 140 is a member connecting the reinforcement member 130 and the fender apron 104, and is a fender apron front member in the present embodiment.

As mentioned above, because the reinforcement member 130 is fixed to the second member 140, the reinforcement member 130 can be supported by the second member 140 when a load is applied from the front to the reinforcement member 130 at the time of a collision. Accordingly, it is possible to prevent the flat plate portion 130a of the reinforcement member 130 from being inclined toward the outer side in the vehicle width direction, and to preferably maintain the attitude of the flat plate portion 130a perpendicular to the traveling direction. Also, a collision body can be received by the flat plate portion 130a that is a wide surface in the vertical direction and the vehicle width direction, and thus an impact load is dispersed. Therefore, load concentration in the collision body can be suppressed, and local deformation of the collision body can be prevented.

Figure 4:
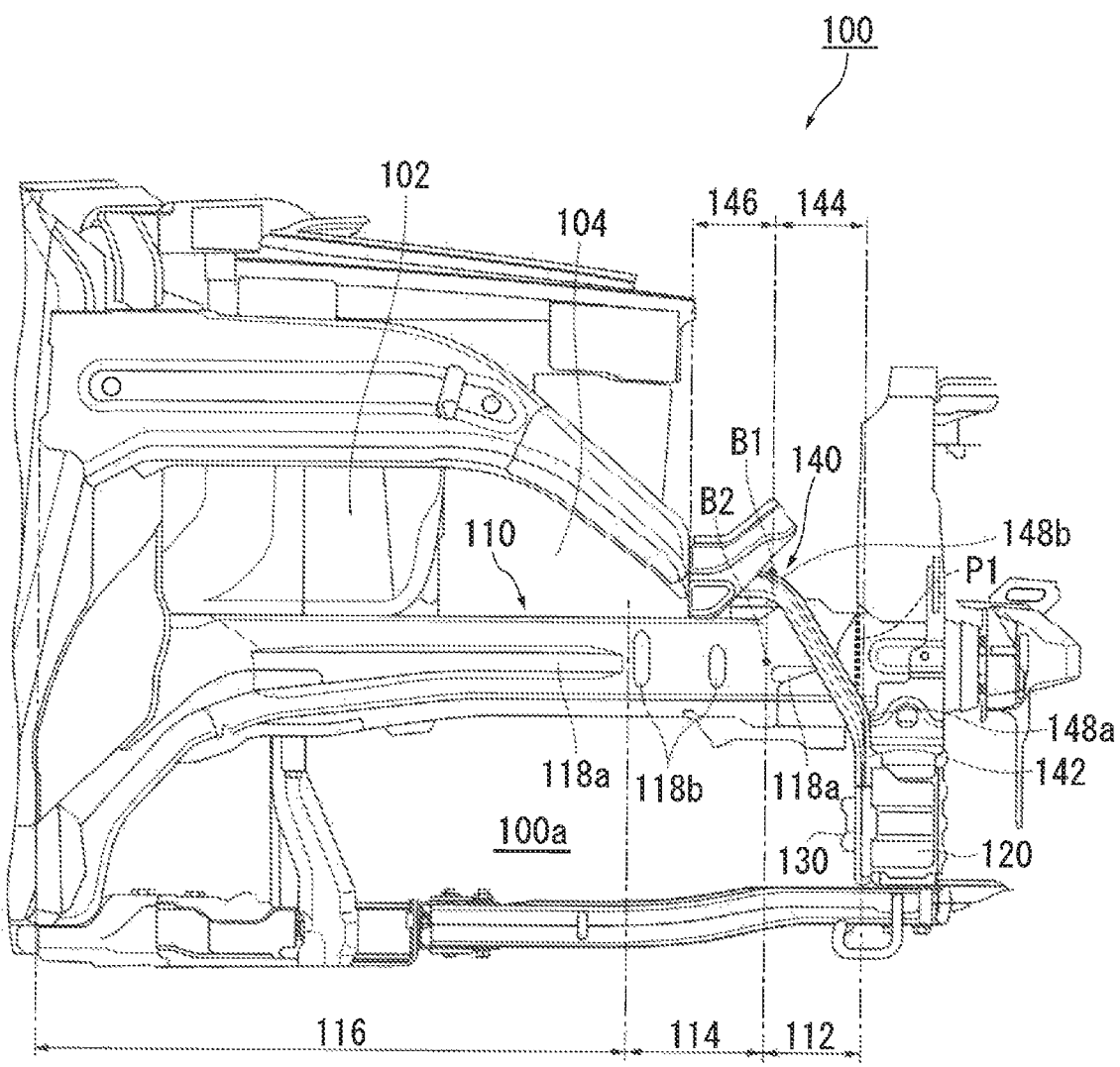
FIG. 4 is a view showing a state in which the vehicle body front structure in FIG. 1 is observed from the outer side of the vehicle.
Figure 4:
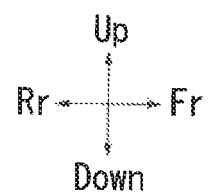
Figure 5:
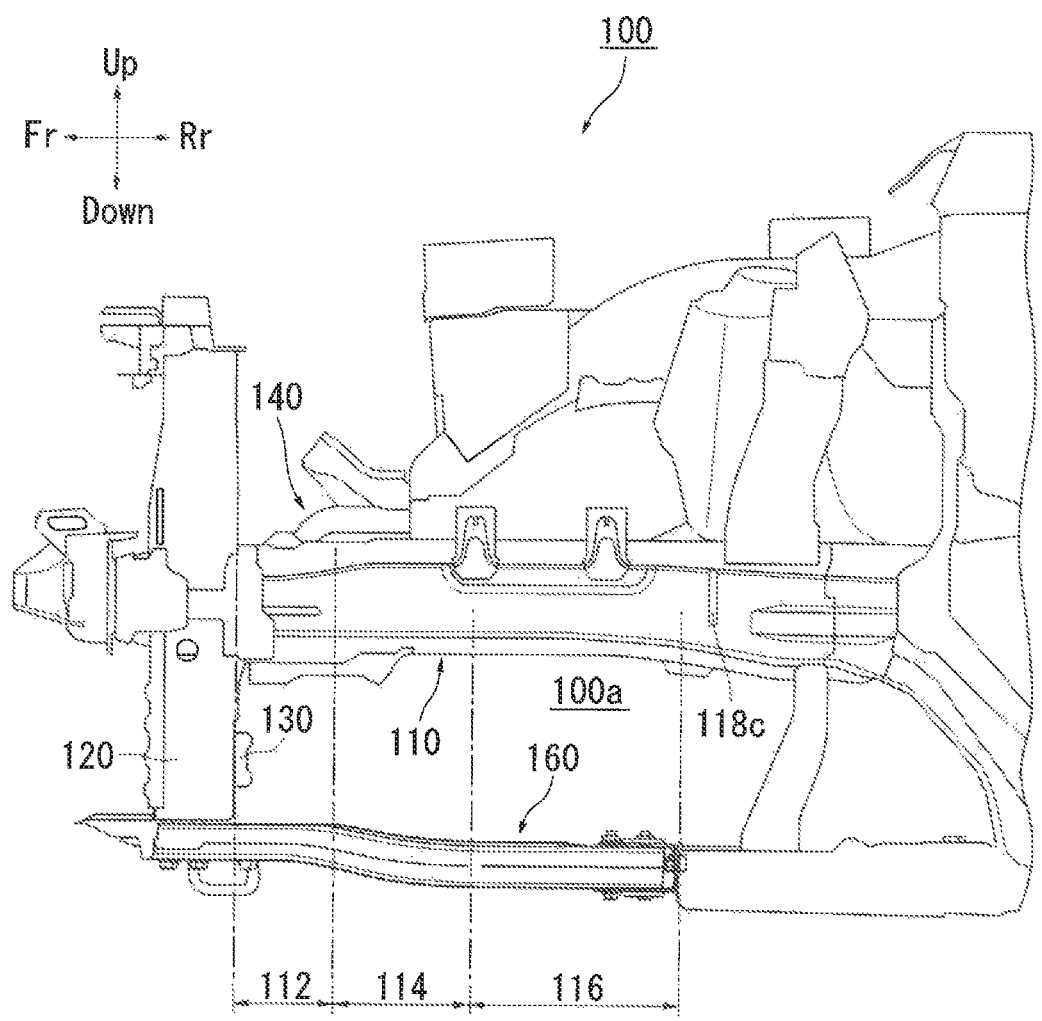
FIG. 5 is a view showing a state in which the vehicle body front structure in FIG. 1 is observed from the inner side of the vehicle.

FIG. 4 is a view showing a state in which the vehicle body front structure 100 in FIG. 1 is observed from the outer side of the vehicle. FIG. 5 is a view showing a state in which the vehicle body front structure 100 in FIG. 1 is observed from the inner side of the vehicle. The front end of the front side member 110 and the first member 120 shown in FIG. 4 are fixed to make it deformable when receiving a load at the time of a collision (a fixed point P1). Also, as shown in FIG. 4, in the vehicle body front structure 100 of the present embodiment, the second member 140 includes a front side portion 142, a middle portion 144, and a rear side portion 146.

The front side portion 142 is a portion that is connected to the rear side of the flat plate portion 130a of the reinforcement member 130 (see FIG. 2), and extends upward parallel to the flat plate portion 130a. The middle portion 144 is a portion that bends toward the rear of the vehicle at the upper end of the front side portion 142, and is inclined upward as it extends toward the rear of the vehicle. The rear side portion 146 is a portion that bends toward the rear of the vehicle at the upper end of the middle portion 144, and extends parallel to the front side member 110. Hereinafter, for convenience of description, the boundary between the front side portion 142 and the middle portion 144 is referred to as a first bent portion 148a, and the boundary between the middle portion 144 and the rear side portion 146 is referred to as a second bent portion 148b.

As the second member 140 has the front side portion 142 parallel to the flat plate portion 130a as in the above configuration, the front side portion 142 can also receive the collision object. Accordingly, because the collision body can be received with a wider surface, it is possible to disperse an impact load more efficiently, and to enhance the above-mentioned effects.

Also, when a load is applied from the front at the time of a collision, the front side member 110 deforms at the boundary with the first member 120. At this time, the second member 140 is also bent to protrude upward at the first bent portion 148a and the second bent portion 148b, so that the middle portion 144 and the rear side portion 146 are deformed to be folded rearward of the vehicle. As a result, the front side portion 142 is maintained in the vertical state, and thus it is possible to prevent the flat plate portion 130a of the reinforcement member 130 from being deformed to be folded backward.

Furthermore, in the present embodiment, the rear end of the second member 140 is connected to the front side member 110 and the fender apron 104. Then, as shown in FIG. 3, the middle portion 144 of the second member 140 is inclined outward in the vehicle width direction as it extends toward the front of the vehicle.

In this manner, when a load in an oblique direction is applied from the outside in the vehicle width direction toward the inside at the time of an offset collision, the load can be transmitted from the second member 140 to members, such as the front side member 110 and the fender apron 104, that are located rearward of the vehicle relative to the second member. Accordingly, the second member 140 reliably supports the reinforcement member 130, and the deformation of the flat plate portion 130a of the reinforcement member 130 in an oblique direction can be prevented. As a result, the attitudes of the flat plate portion 130a of the reinforcement member 130 and the front side portion 142 of the second member 140 can be suitably maintained, and the collision body can be received over a wide area.

Figure 6A:
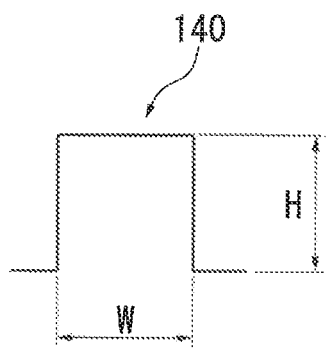
FIGS. 6A, 6B, and 6C are schematic cross-sectional views showing a cross-sectional shape of a second member.
Figure 6B:
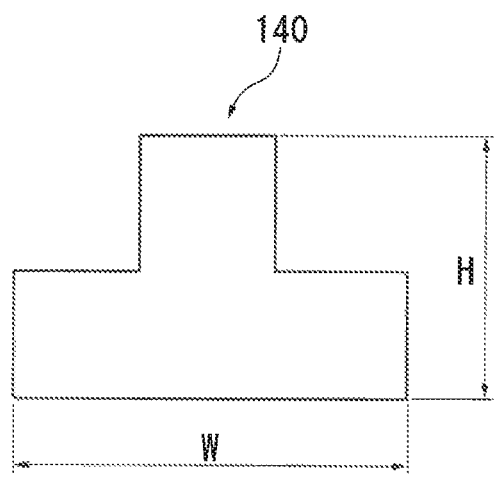
Figure 6C:
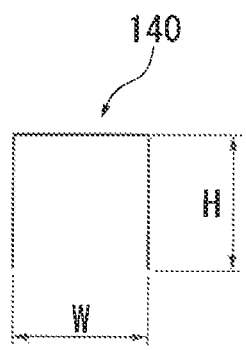

FIGS. 6A, 6B, and 6C are schematic cross-sectional views showing a cross-sectional shape of the second member 140. In the present embodiment, as shown in FIG. 6A, the second member 140 has a hat-shaped cross section. Specifically, the front side portion 142 and the middle portion 144 each have a hat shape protruding toward the front of the vehicle, and the rear side portion 146 has a hat shape protruding toward the upper side. With this configuration, the second member 140 can obtain high rigidity at the time of non-collision, and can sufficiently absorb impact at the time of a collision.

Although the hat shape shown in FIG. 6A was illustrated in the present embodiment, the shape is not limited to this. The same effect as mentioned above can be obtained by setting the cross-sectional shape of the second member 140 to a cross-sectional shape, as shown in FIG. 6B, in which the shape of the space of the closed cross section is a protruding shape, or by selling the cross-sectional shape of the second member 140 to a rectangular wave-like cross-sectional shape, as shown in FIG. 6C, in which the lower side or the rear side of the vehicle is open.

In addition, in the present embodiment, the dimension H of the second member 140 that protrudes in the cross section is set to be the largest at the rear side portion 146, and to be smaller as it extends toward the middle portion 144 and the front side portion 142. Then, the width W of the cross section in the vehicle width direction is set to be narrower at the middle portion 144 than at the front side portion 142 and the rear side portion 146. With this configuration, a load tends to concentrate on the boundary between the front side portion 142 and the middle portion 144, and the boundary between the middle portion 144 and the rear side portion 146, that is, the first bent portion 148a and the second bent portion 148b. Therefore, deformation of the first bent portion 148a and the second bent portion 148b can be promoted at the time of a collision.

Here, FIG. 4 is referred again. In the vehicle body front structure 100 of the present embodiment, the front side member 110 includes a first region 112, a second region 114, and a third region 116. The first region 112 is a portion extending rearward from the front end. The second region 114 is a portion extending from the rear side of the first region 112 toward the rear of the vehicle. The third region 116 is a portion extending from the rear side of the second region 114 toward the rear of the vehicle.

Reinforcement shapes 118a extending in the vehicle longitudinal direction are formed in the first region 112 and the third region 116. With this configuration, the first region 112 and the third region 116 have higher rigidity than the second region 114. Also, an easily deformable shape 118b extending in the vertical direction of the vehicle is formed in the second region 114. With this configuration, the first region 112 and the third region 116 relatively have still higher rigidity than the second region 114.

As shown in FIG. 5, a fragile shape 118c, which is more fragile than its surroundings, extending in the vertical direction is formed on the inner side surface portion of the vehicle at the rear end of the third region 116 of the front side member 110. With this configuration, at the rear end of the third region 116, deformation in the vehicle longitudinal direction when a collision load is applied is promoted. As a result, when a load is applied to the front side member 110 at the time of a collision, the front side member 110 is deformed and protrudes toward the inside of the vehicle at the easily deformable shape 118b and protrudes toward the outside of the vehicle at the fragile shape 118c.

In the present embodiment, the boundary B1 between the first region 112 and the second region 114 and the boundary B2 between the middle portion 144 and the rear side portion 146 of the second member 140, that is, the second bent portion 148b are disposed at the same position in the vehicle longitudinal direction. With this configuration, when the first member 120 moves to the rear of the vehicle due to a load at the time of a collision, the boundary B1 between the first region 112 and the second region 114 of the front side member 110 and the boundary B2 between the middle portion 144 and the rear side portion 146 of the second member 140 are deformed at the same position in the vehicle longitudinal direction.

As mentioned above, by the front side member 110 and the second member 140 being deformed at the same position in the vehicle longitudinal direction, at the front end portion of the vehicle body, it is possible to suppress the variation in rigidity of the deformed portions of the reinforcement member 130, the first member 120, and the second member 140. As a result, because the flat plate portion 130a of the reinforcement member 130 and the front side portion 142 of the second member 140 can be maintained parallel to the front surface of the first member 120, the difference in the amount of deformation can be reduced and these portions are uniformly deformed. Therefore, it is possible to more preferably prevent local deformation of a collision body of a collision object.

Although the preferred embodiment of the present invention has been described with reference to the accompanying drawings, it should be appreciated that the present invention is not limited to the embodiment described above. It will be apparent for a person skilled in the art that various modifications and variations may be made within the scope of the invention as defined in the appended claims, and those modifications and variations should be understood to be included within the technical scope of the present invention.

The present invention can be used for a vehicle body front structure.

The invention claimed is:

1. A vehicle body front structure comprising a front side member extending in the longitudinal direction on the side of a power unit mounting room located at the front of a vehicle, the vehicle body front structure further comprising:

a strut tower that is disposed on the outer side in the vehicle width direction of the front side member, a fender apron disposed on the front side of the strut tower and on the outer side in the vehicle width direction of the front side member;

a first member fixed to the front end of the front side member and extending in the vertical direction;

a reinforcement member fixed to the outer side in the vehicle width direction of the lower end of the first member, the reinforcement member having a flat plate portion facing the front of the vehicle over a length in the vertical direction; and a second member connecting the reinforcement member and the fender apron.

2. The vehicle body front structure according to claim 1, wherein the front end of the front side member and the first member are fixed so that the front end of the front side member and the first member are deformable when receiving a load at the time of a collision, and the second member includes:

a front side portion connected to the rear side of the flat plate portion of the reinforcement member and extending upward parallel to the flat plate portion;

a middle portion bending toward the rear of the vehicle at the upper end of the front side portion and inclined upward as the middle portion extends toward the rear of the vehicle; and a rear side portion bending toward the rear of the vehicle at the upper end of the middle portion and extending parallel to the front side member.

3. The vehicle body front structure according to claim 2, wherein the rear end of the second member is connected to the front side member and the fender apron, and the middle portion of the second member is inclined to the outer side in the vehicle width direction as the middle portion extends toward the front of the vehicle.

4. The vehicle body front structure according to claim 2, wherein the second member has a rectangular wave-like or a hat-shaped cross section that protrudes toward the upper side or the front side of the vehicle, the protruding dimension of the cross section is the largest at the rear side portion, and decreases as the cross section is close to the middle portion and the front side portion, and the width of the cross section in the vehicle width direction is narrower at the middle portion than at the front side portion and the rear side portion.

5. The vehicle body front structure according to claim 3, wherein the second member has a rectangular wave-like or a hat-shaped cross section that protrudes toward the upper side or the front side of the vehicle, the protruding dimension of the cross section is the largest at the rear side portion, and decreases as the cross section is close to the middle portion and the front side portion, and the width of the cross section in the vehicle width direction is narrower at the middle portion than at the front side portion and the rear side portion.

6. The vehicle body front structure according to claim 2, wherein the front side member includes:

a first region extending rearward from the front end;

a second region extending from the rear side of the first region; and
a third region extending from the rear side of the second region,
the first region and the third region have higher rigidity than the second region, and
the boundary between the first region and the second region and the boundary between the middle portion and the rear side portion of the second member are disposed at the same position in the vehicle longitudinal direction.

7. The vehicle body front structure according to claim 3, wherein
the front side member includes:
a first region extending rearward from the front end;
a second region extending from the rear side of the first region; and
a third region extending from the rear side of the second region,
the first region and the third region have higher rigidity than the second region, and
the boundary between the first region and the second region and the boundary between the middle portion and the rear side portion of the second member are disposed at the same position in the vehicle longitudinal direction.

8. The vehicle body front structure according to claim 4, wherein
the front side member includes:
a first region extending rearward from the front end;
a second region extending from the rear side of the first region; and
a third region extending from the rear side of the second region,
the first region and the third region have higher rigidity than the second region, and
the boundary between the first region and the second region and the boundary between the middle portion and the rear side portion of the second member are disposed at the same position in the vehicle longitudinal direction.

9. The vehicle body front structure according to claim 5, wherein
the front side member includes:
a first region extending rearward from the front end;
a second region extending from the rear side of the first region; and
a third region extending from the rear side of the second region,
the first region and the third region have higher rigidity than the second region, and
the boundary between the first region and the second region and the boundary between the middle portion and the rear side portion of the second member are disposed at the same position in the vehicle longitudinal direction.

* * * * *